Figure 1:
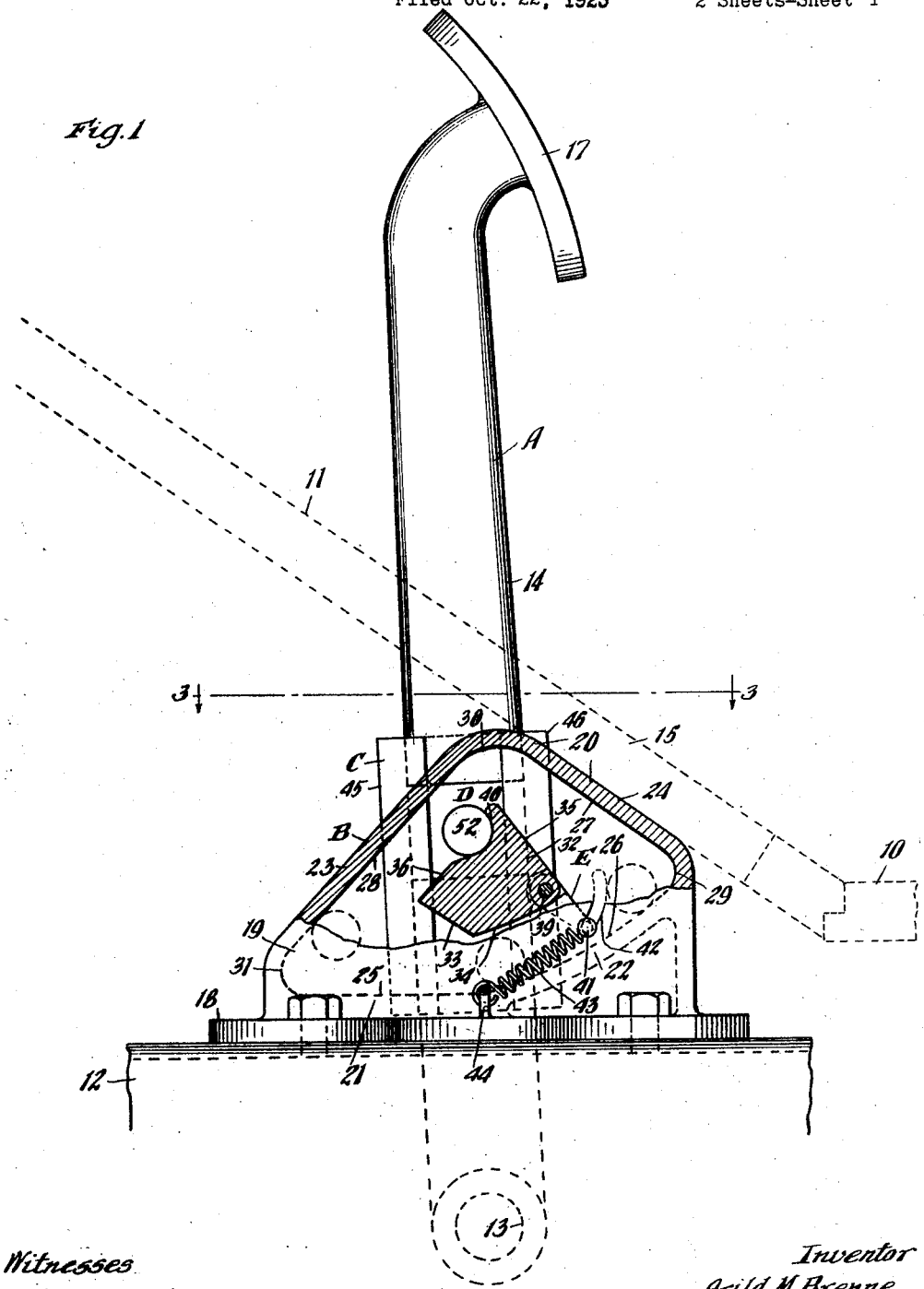

Sept. 29, 1925.

A. M. BRENNE 1,555,629

CLUTCH CONTROL MECHANISM

Filed Oct. 22, 1923    2 Sheets-Sheet 1

Witnesses
Wm. Geiger

Inventor
Arild M. Brenne
By George J. Haight
His Atty.

Sept. 29, 1925. 1,555,629
A. M. BRENNE
CLUTCH CONTROL MECHANISM
Filed Oct. 22, 1923 2 Sheets-Sheet 2
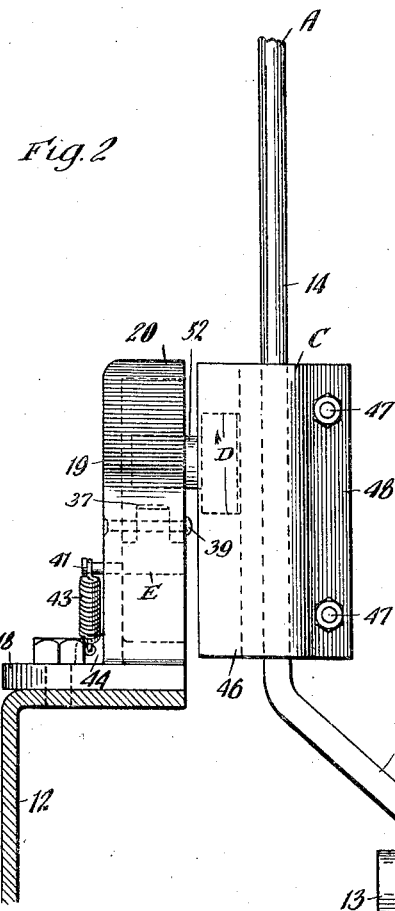
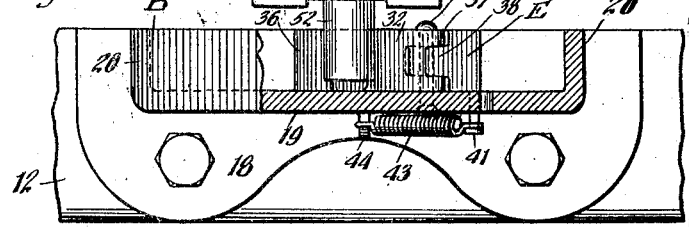

Patented Sept. 29, 1925.

1,555,629

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

CLUTCH-CONTROL MECHANISM.

Application filed October 22, 1923. Serial No. 670,138.

*To all whom it may concern:*

Be it known that I, ARILD M. BRENNE, a citizen of the United States, residing at Chicago, in the county of Cook and State of Illinois, have invented a certain new and useful Improvement in Clutch-Control Mechanisms, of which the following is a full, clear, concise, and exact description, reference being had to the accompanying drawings, forming a part of this specification.

This invention relates to improvements in clutch control mechanisms.

This invention is particularly adapted to clutch control mechanisms for automobiles of that type wherein a clutch control lever is employed which may assume any one of three positions, i. e. a central or neutral position, in which the clutch of the vehicle is disengaged, a forward position in which the low speed gearing is made effective, and a rearward position in which the high speed gearing is made effective. In this particular type of vehicle, the clutch control lever is continually under the influence of a spring which tends to force the same to and yieldingly maintain it in the high speed position, it being necessary to manually hold the lever in the other two positions. Substantially no difficulty is experienced in manually bringing the lever to its extreme forward position and holding it there, but much difficulty is experienced in properly gauging the neutral position and manually maintaining the lever in the latter position. It will be evident that it is important that the lever be held in proper neutral position when for any reason the engine is allowed to idle, as for example, when the vehicle is allowed to proceed with the engine out of gear or it is momentarily stopped without applying the emergency brake, the brake lever of which provides the only means for holding the clutch lever or pedal in neutral position.

One object of the invention is to provide a very simple and efficient means controlled by the operation of the clutch lever or pedal whereby the neutral position thereof may be automatically determined and the lever retained in that position independently of any effort on the part of the operator.

Another object of the invention is to provide a mechanism of the character indicated, wherein means is provided for positively preventing the movement of the clutch lever or pedal directly from neutral to high speed position but permitting the lever to be moved from neutral to first or low speed position and then to high speed position.

Another object of the invention is to provide a mechanism of the character indicated which may be readily applied as a unit to automobiles now in use without making any change in or rearrangement of the original parts of the vehicle.

Other objects and advantages of the invention will more clearly appear from the description and claims hereinafter following.

In the drawings forming a part of this specification, Figure 1 is a side elevational view of a portion of an automobile superstructure, showing my improvements in connection therewith, certain parts being shown in section and the position of the control lever or pedal being its intermediate or neutral one. Figure 2 is a side elevational view of the structure shown in Figure 1, partially broken away and partially in section. And Figure 3 is a horizontal, sectional view corresponding substantially to the line 3—3 of Figure 1, the housing being also partly in section.

In said drawings, 10 denotes the floor board of an automobile, 11 the inclined foot board through which the control pedal or lever A is extended and 12 one of the side members of the chassis to which my improved attachments are adapted to be secured. As customary, the control pedal A is secured to a shaft 13 running to the transmission gearing, it being understood that the shaft 13 is under spring tension always tending to throw the pedal A to the high speed position which is to the right of the position shown in Figure 1. The present practice is to make the pedal A extend vertically as indicated at 14 through a slot 15 of the foot board and the lower end thereof is offset laterally toward the gear case as indicated at 16 in Figure 2. The pedal A is provided with the usual foot piece 17 by which the same is manipulated.

The improved attachments as shown, consist, broadly, of a housing B, a guide block C, a cross head D, and a spring actuated gate or pawl E.

The housing B is preferably in the form of a casting, having a base 18 and a vertically disposed wall 19 upstanding therefrom provided with a continuous laterally projecting flange 20, the housing being secured to the side member 12 by bolts passing through the base member. The lower portion of the flange 20 comprises a horizontally extending section 21 at the front end of the housing and an upwardly and rearwardly inclined section 22 at the rear end of the housing, the section 22 being slightly concave as clearly shown in Figure 1. The upper portion of the flange 20 comprises upwardly converging sections 23 and 24, the section 23 being inclined to a greater degree than the section 24. The sections 21, 22, 23 and 24 of the flange 20 present inner guide faces 25, 26, 27 and 28, curved connecting faces 29, 30 and 31, being preferably provided between the faces 26 and 27, 27 and 28 and 28 and 25 respectively. The wall 19 is also provided with a laterally extending projection 32 disposed substantially centrally with reference to the flange 20 and provided with a plurality of cam faces 33, 34, 35 and 36, the cam faces 33 and 34 being located at the lower side of the projection 32 and respectively inclined upwardly toward the front and rear of the housing, the cam face 33 being more steeply inclined than the face 34 and the latter being slightly convexly curved. The cam faces 35 and 36 are located on the upper side of the projection 32, the cam face 35 being steeper than the face 36, and disposed at an angle to the face 24 of the flange 20. It will be evident that a continuous guideway is this presented between the projection 32 and the flange 20 of the housing B. At the meeting point of the cam faces 34 and 35, the projection 32 is vertically slotted as indicated at 37, thereby providing a forked portion receiving a reduced extension 38 on the gate member E. A pivot pin 39 extending through the forked portion and the extension 38 serves to pivotally support the gate, the pin being secured in position by having the opposite ends thereof upset. Near the upper end of the inclined face 36, a notch is provided thereby presenting a curved stop shoulder 40 for a purpose hereinafter described. The gate E is limited in its swinging movements by a pin 41 laterally projecting therefrom and extending through an arcuate slot 42 in the vertical wall 19 of the housing, the opposite end walls of the slot limiting the swinging movement of the pin. The slot 42 is so disposed that when the pin engages the lower end wall thereof, the upper surface of the gate E will be in alinement with the inclined face 35 of the projection 32. A spring 43 having one of its ends secured to the pin 41 and the other end secured to an upstanding lug 44 on the base 18 yieldingly retains the gate E in its lowermost position, as clearly shown in Figure 1.

The guide block C is composed of two similar sections 45 and 46, clamped together by bolts 47—47 or any other suitable fastening devices extending transversely through lugs 48—48 at the upper and lower ends of the respective sections at one side of the block and vertically extending flanges 49—49 on the respective sections at the opposite side of the block. Each of the sections 45 and 46 is cut away at the inner side so as to provide a vertically extending opening 50 adapted to receive the shank 14 of the pedal A. At the side of the guide block C adjacent the housing B, each of the sections 45 and 46 are undercut as shown, thereby providing a vertically extending dovetailed guideway 51 adapted to receive the cross head D for sliding movement. When the guide block C is mounted on the pedal A, the bolts serve to clamp the sections tightly to the pedal so that the block will be permanently fixed thereto, and yet permit free sliding movement of the cross head within the guideway 51.

The cross head D is in the form of a dovetail shaped block and is provided with a cylindrical projection or pin 52 extending laterally therefrom. When the parts are in assembled relation, the pin 52 of the cross head D extends within the guideway of the housing A and is adapted to coact with the inclined faces of the flange 20 and projection 32. As clearly shown in Figure 1, the pin 52 is of such a size that it fits the notch in the projection 32 and is adapted to be retained by the shoulder 40.

The operation of the mechanism is as follows, assuming that the pedal A is initially in its intermediate or neutral position, as shown in Figure 1. While in this position, it is evident that the pedal cannot move in a clockwise direction inasmuch as it is restrained from so doing through the intermediary of the pin 52 on the cross head D engaging with the shoulder 40 of the projection 32. The only movement of the pedal A therefore is in a counter clockwise direction that is, the low speed position of the transmission wherein the pin 52 will be carried to the position shown in dotted lines at the left hand side of Figure 1. As the pedal A is moved toward its low speed position, the pin 52 is moved out of engagement with the shoulder 40, and as the lever swings on its pivot, the pin engages the inclined face 28 thereby forcing the pin together with the cross head D downwardly to the dotted line position shown at the left in Figure 1. Upon movement of the lever in a reverse or clockwise direction, after the pin has reached the position shown at the left in Figure 1, it is evident that the pin will be swung with the lever until it again engages the projection 32 now coming in contact with the downwardly inclined face 33 thereof, and the pin together with the cross head is further displaced downwardly with reference to the pedal A until it passes beyond the end of the inclined face 33 and engages with the upwardly inclined curved face 26. During the further movement of the lever in a clockwise direction, due to engagement with the face 26, the pin 52 together with the slide D will be raised until the same reaches the dotted line position shown at the right hand side of Figure 1, in which the position of the lever corresponds to the high operating speed. It will be evident that during the movement of the pin 52 to the position shown at the right hand side of Figure 1, the gate E will be swung upwardly thereby against the tension of the spring 43 and that as soon as the pin has passed beyond the end of the gate, the latter will be returned to the position shown in Figure 1, being arrested in its movement by engagement of the stop pin 41 with the lower end of the slot 42. The gate thus effectively blocks the passageway below the projection 32, and as the same is in alinement with the inclined face 35 of the projection, in the next movement of the lever in a counter clockwise direction, the pin 52 will be guided upwardly along the cam face 35. When it is desired to bring the pedal A to its neutral position and retain it in that position, the same is moved in a clockwise direction moving the pin therewith from the dotted line position shown at the right of Figure 1 into engagement with the inclined face 35 and along the same until it passes beyond the projection 32 and engages with the downwardly inclined face 28 of the flange 20, whereupon the pin will again be forced to move downwardly. The pedal A is thrown an appreciable distance beyond the full line position shown in Figure 1, that is, the neutral position so that the pin will be displaced downwardly a sufficient distance by engagement with the inclined face 28 to assure of the same engaging with the shoulder 40 of the projection 32 when the lever is moved in a clockwise direction back to the neutral position. The lever is then allowed to return to the neutral position shown in Figure 1 in which it will be arrested and retained by the pin 52 engaging the shoulder 40.

I have herein shown and described what I now consider the preferred manner of carrying out my invention but the same is merely illustrative and I contemplate all changes and modifications which come within the scope of the claims appended hereto.

I claim:

1. In a device of the character described, the combination with a control lever movable to two extreme positions and to an intermediate neutral position; of means for arresting movement of said lever in the neutral position and preventing movement of the same to one of said extreme positions only, said means including a locking element longitudinally movable with reference to said lever operative through the lever during movement thereof to the other extreme position to alter the relative positions of said lever and element and render said element inactive, thereby permitting movement of the lever directly from one extreme position to the other.

2. In a device of the character described, the combination with a control lever movable to two extreme positions and to an intermediate neutral position; of a locking element mounted on the lever for movement therewith and longitudinally relatively thereto; guide means coacting with said locking element to guide the same along one path while the lever is swung in one direction from one extreme position to the other, and along a different path when the lever is swung in the reverse direction from one extreme position to the other; and means located in one of said paths engagable with said locking element for preventing movement of the lever to one of said extreme positions.

3. In a device of the character described, the combination with a control lever movable to two extreme positions and to an intermediate neutral position; of means for preventing movement of said lever to one of said extreme positions from the neutral position and retaining the same in the neutral position, said means including a latch element slidably mounted on the lever, and a coacting fixed stop; means cooperating with said latch, operative during actuation of the lever from neutral to the other extreme position for moving the latch element along said lever and displacing the same with reference to said stop, to clear the latter to permit movement of the lever directly from said last named extreme position to the other extreme position.

4. In a device of the character described, the combination with a control lever movable to two extreme positions and to an intermediate neutral position; of a locking element slidably mounted on said lever; a fixed stop coacting with said element to hold the lever in neutral position; means for bringing said element and stop into operative position when the lever is moved in one direction from one of its extreme positions; and means for preventing engagement of said stop and element when the lever is moved in a reverse direction from one extreme position to the other.

5. In a device of the character described, the combination with a control lever pivotally mounted on the frame of a car for movement to two extreme positions and to an intermediate neutral position; of coacting means on said lever and car frame for arresting movement of said lever in neutral position and retaining it in said position, said means including a latch element longitudinally movable with reference to said lever and a coacting stop.

6. In a device of the character described, the combination with a speed control lever movable to two operative positions and to an intermediate neutral position; of means for arresting movement of said control lever in one direction when in neutral position, but permitting free movement of said lever in a direction opposite thereto to one of said operative positions said means including a locking element longitudinally movable with reference to said lever; and means for rendering said arresting means ineffective when the lever is moved directly from one operative position to the other.

7. In a device of the character described, the combination with a speed control lever movable to two operative positions and to an intermediate neutral position and normally retained in one of said operative positions; of stop means including a stationary element and a co-acting member slidably mounted on said lever effective for preventing movement of the same from neutral position to said normal position after movement of the lever from normal operative position to a point between neutral and the other operative positions thereof.

8. In a device of the character described, the combination with a control lever movable to two extreme positions and to an intermediate neutral position; of a finger slidably mounted on said lever; a fixed guide member having a continuous guideway therein adapted to coact with said finger, said guideway having a stop shoulder therein adapted to coact with said finger to retain said finger in neutral position.

9. In a device of the character described, the combination with a control lever movable to two extreme positions and to an intermediate neutral position; of a fixed guide member having a guideway therein; of means longitudinally movable with reference to said lever said means being guided in said guideway; and stop means in said guideway adapted to arrest said first named means and retain the lever in neutral position.

10. In a device of the character described, the combination with a control lever movable to two extreme positions and to an intermediate neutral position; of a finger slidably mounted on said lever; a fixed cam member coacting with said finger, said cam member having a shoulder thereon adapted to engage said finger when the lever is brought to neutral position and retain the lever in that position.

11. In a device of the character described, the combination with a control lever movable to two extreme positions and to an intermediate neutral position; of a finger reciprocally mounted on said lever; a fixed guide member having inclined guide faces cooperating with said finger for guiding the same, one of said faces having an abutment shoulder thereon adapted to engage the finger and retain the lever in neutral position.

12. In a device of the character described, the combination with a control lever movable to two extreme positions and to an intermediate neutral position; of a finger movably mounted on the lever; a guide member having inclined guide faces cooperating with said finger for guiding the same along different paths during movement of the lever in reverse directions; stop means on said guide member adapted to arrest movement of the same when the lever is in neutral position and retain said lever in that position; and means associated with one of said inclined guide faces for causing the finger to travel in a definite direction.

13. In a device of the character described, the combination with a control lever movable to two extreme positions and to an intermediate neutral position; of a finger reciprocally mounted on the lever; guide means having inclined guide faces cooperating with said finger for guiding the same along two distinct paths during movement of the lever in reverse directions; stop means on said guide member adapted to engage said finger when the lever is in neutral position and retain the latter in that position; and a swinging gate associated with one of said inclined guide faces to cause the finger to travel in a predetermined direction.

14. In a device of the character described, the combination with a control lever pivotally mounted on a support and movable to two operative positions and an intermediate neutral position; of a bracket fixed on the lever; a slide reciprocally mounted on said bracket; a finger on said slide; a housing secured to said support, said housing having upper and lower inclined communicating guideways in which said pin is adapted to work; and a stop shoulder in the upper guideway adapted to arrest movement of said pin in the neutral position of said lever.

15. In a device of the character described, the combination with a control lever mounted on a support for movement to two extreme positions and to an intermediate neutral position; of a bracket fixed to the lever; a slide reciprocally mounted on said bracket; a finger on said slide; a housing secured to said support, said housing having upper and lower inclined communicating guideways in which said pin is adapted to work; and a yielding gate in said lower guideway adapted to open in one direction only, thereby determining the direction of movement of said finger.

16. In a device of the character described, the combination with a control lever movable to two extreme positions and to an intermediate neutral position; of means for preventing movement of said lever to one of said extreme positions from the neutral position and retaining the same in neutral position, said means including a locking element movably mounted with respect to the lever, and a co-acting fixed stop; means operative during actuation of the level from neutral to the other extreme position for moving the locking element to displace the same with reference to said stop to clear the latter and permit movement of the lever directly from said last named extreme position to the other extreme position.

17. In a device of the character described, the combination with a control lever movable to two extreme positions and to an intermediate neutral position; of means for arresting movement of said lever in the neutral position and preventing movement of the same to one of said extreme positions only, said means including a locking element having a traveling connection with reference to said lever, said element being operative through the lever during movement thereof to the other extreme position to alter the relative positions of said lever and element and render said element inactive, thereby permitting movement of the lever directly from one extreme position to the other.

In witness that I claim the foregoing I have hereunto subscribed my name this 17th day of October 1923.

ARILD M. BRENNE.